United States Patent [19]

Bielli et al.

[11] Patent Number: 4,835,087

[45] Date of Patent: May 30, 1989

[54] METHOD OF MAKING A DICHROIC ANTENNA STRUCTURE

[75] Inventors: Paolo Bielli, Benne di Corio (Turin); Daniele Bresciani, Turin; Salvatore Contu, Pecetto Torinese (Turin); Giuseppe Cocito, San Guiste Canavese (Turin), all of Italy

[73] Assignee: Cselt-Centro Studi E Laboratori Telecomunicazioni Spa, Turin, Italy

[21] Appl. No.: 79,817

[22] Filed: Jul. 30, 1987

[30] Foreign Application Priority Data

Aug. 4, 1986 [IT] Italy .............................. 67628 A/86

[51] Int. Cl.[4] .............................................. G03C 5/00
[52] U.S. Cl. .................................... 430/318; 430/319;
430/394; 430/935; 355/47
[58] Field of Search ............... 430/313, 318, 319, 323,
430/320, 394, 935; 355/53, 47

[56] References Cited

U.S. PATENT DOCUMENTS 3,694,080  9/1972  Matsky .................................. 355/86
3,907,565  9/1975  Burton et al. ................... 430/314 X
4,001,836  1/1977  Archer et al. ....................... 343/756
4,388,388  6/1983  Kornbau et al. .................... 430/258

OTHER PUBLICATIONS

"Dichroic Subreflectors for Multifrequency Antennas", by Bielli et al., Published in CSELT Technical Reports, vol. Xiii, No. 7, Dec. 1985.

"Design of Dichroic Cassegrain Subreflector", by Vishwani D. Agrawal et al., IEEE Transactions, vol. AP27, No. 4, Jul. 1979.

Primary Examiner—José G. Dees
Attorney, Agent, or Firm—Herbert Dubno

[57] ABSTRACT

A method of manufacturing dichroic antenna structures, which makes use of a projector mounted on the mobile arm of a computer-controlled machine to project the shape of selective antenna elements on the surface of an insulating layer, clad with a metallic layer covered in turn with a photographic emulsion. Development and chemical etching of the excess conductive parts are then carried out.

9 Claims, 4 Drawing Sheets

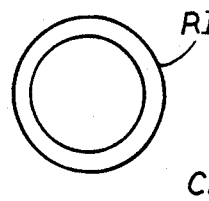
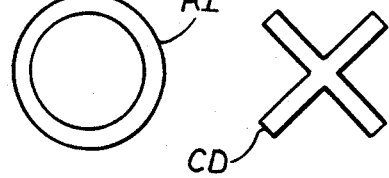
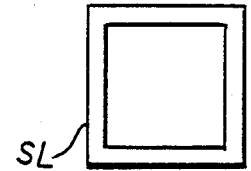
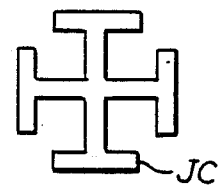
FIG.1A  FIG.1B  FIG.1C  FIG.1D
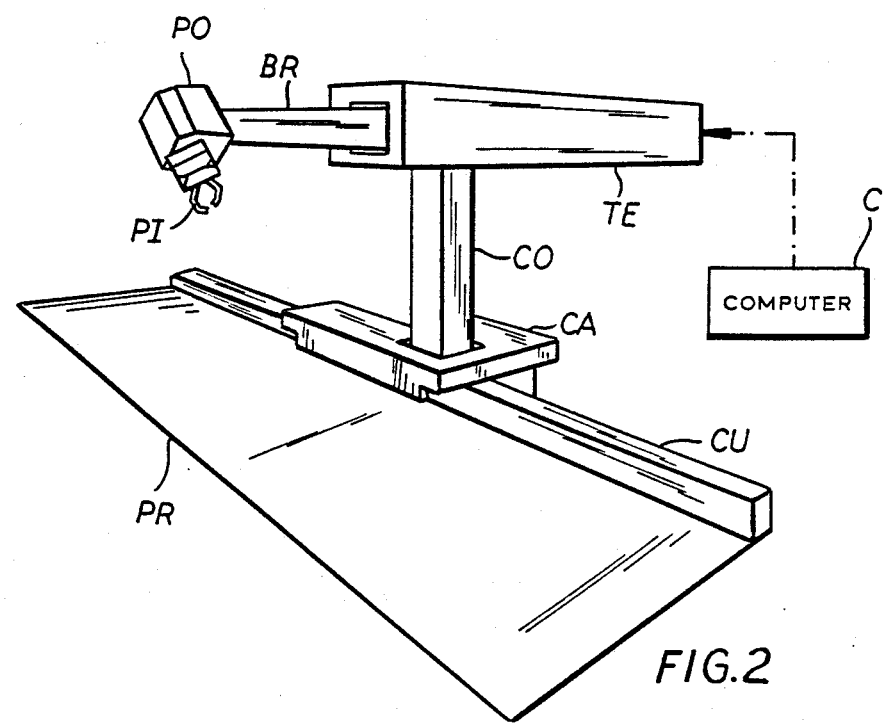
FIG.2

METHOD OF MAKING A DICHROIC ANTENNA STRUCTURE

FIELD OF THE INVENTION

Our present invention relates to telecommunications equipment using electromagnetic radiation in the microwave range and, more particularly, to a method of manufacturing a dichroic antenna structure.

BACKGROUND OF THE INVENTION

As is known, a dichroic antenna structure consists of a surface presenting transmissive properties for radiation at certain frequencies and polarization and reflective properties for other radiation.

The most-widely used shapes for such surfaces are the round paraboloid, the round or doubly-curved ellipsoid, etc.

Generally the shape selected is the one best suited to form a reflector or subreflector of a microwave antenna system.

This surface is made of a dielectric material with good mechanical properties and on which a conductive grid, consisting of a plurality of selective antenna elements, is deposited.

This grid is generally built up by using elements having the shape of a ring, a cross, a strip, etc. The dimensions of the elements generally depend on the wavelength of the operative electromagnetic radiation and the required tolerances, both in dimensions and in the distance between the elements (interaxis or interspaced), are equal; to a few thousandths of wavelength of the reflected electromagnetic field. For instance, at a frequency of 20 GHz, the accuracy demanded is + or −100 μm. This small tolerance gives rise to difficulties in applying with the desired accuracy, the great number of necessary antenna elements, taking into account, in addition, that they are to be arranged on a curved surface.

The antenna elements have generally been fabricated by a method used for manufacturing printed circuits, using photographic masking and chemical etching. However, the use of this method is not without difficulties, since the mask can only be obtained on a plane surface, while the support onto which it is to be projected can have a curved surface of the previously mentioned type.

A number of solutions to this problem are known in the art. For example, see the paper entitled *Design of a Dichroic Cassegrain Subreflector* by Vishwani D. Agrawal et alii, IEEE Transactions on Antennas and Propogation, Vol. AP27, No. 4, July 1979. The dichroic surface, consisting of crossed dipoles, is fabricated according to a photoetching technique on a plane Kevlar surface. This is afterwards laid on an aluminum mold of desired shape, is covered with layers of protective material and is pressed against the mold with a vacuum bag. The layer stack is finally baked in a high-temperature oven.

The accuracy attainable by this method is not very high, since the deformations undergone by the plane dichroic surface, when pressed against the curved mold, cannot be controlled. In fact these deformations depend on many factors difficult to control, such as the uniformity of the thickness of the dichroic surface, the uniformity of the pressure exerted, etc.

Another solution is described in U.S. Pat. No. 4,001,836. According to this proposal, the dichroic structure is directly fabricated on the final curved structure making a mask by applying bent strips, arranged side by side. Clearly, this method is not highly satisfactory both because strips must be manually deposited and because it is time consuming. Moreover the approach is valid only for parabolic surfaces.

OBJECT OF THE INVENTION

It is the object of the present invention, to provide an improved method which allows a dichroic antenna structure to be directly made on an arbitrary curved surface, with elements of arbitrarily selected shape and with high accuracy in dimensions and position, fully thereby eliminating the afore-described drawbacks.

SUMMARY OF THE INVENTION

This object is attained in accordance with the present invention which provides a method of manufacturing a dichroic antenna structure, consisting of at least one insulating layer with one or both thereof covered with conductive selective antenna elements, which comprises the following steps:
- construction of the insulating layer with the desired shape of the lateral surfaces;
- metallization of one or both lateral surfaces;
- deposition of a uniform layer of photographic emulsion on each metallic layer;
- projection of the shapes of said selective antenna elements on said photographic emulsion layer by a projector mounted on the mobile arm of a computer-controlled machine;
- development of said photographic emulsion; and
- chemical etching of the conductive parts in the pattern determined by the development to leave the array of antenna elements.

BRIEF DESCRIPTION OF THE DRAWING

The above and other objects, features, and advantages of my invention will become more readily apparent from the following description, reference being made to the accompanying highly diagrammatic drawing in which:

FIGS. 1A–1D are diagrams of various possible selective antenna elements;

FIG. 2 is a perspective view of an assembling robot;

SPECIFIC DESCRIPTION

Figure 3:
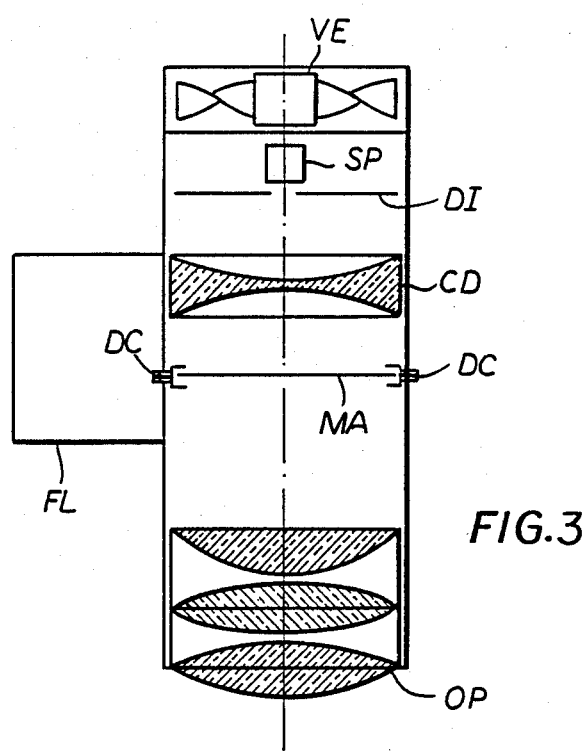
FIG. 3 is a schematic section of a projector.

The following description concerns a method of fabricating a dichroic antenna structure of the type described in the paper entitled "Dichroic Subreflectors for Multifrequency Antennas" by P. Bielli et al, CSELT Technical Reports - Vol. XIII No. 7, December 1985.

More particularly, the paper illustrates the complex series of insulating and conductive layers, forming a dichroic subreflector, and some typical selective antenna elements. For greater convenience, the latter are also represented in FIGS. 1A–1D. Reference characters RI, CD, SL, JC denote elements shaped as rings, crossed dipoles, square loops and Jerusalem cross.

According to the method of the invention, the structure made of dielectric material, acting as a support the grid or array of antenna elements, is fabricated first. This structure can be obtained by machining the material using a computer-controlled machine equipped with a cutterhead, or by pressing it in a mold obtained in the same way. Its surface, which can be either plane or curved, presenting in this second case either a convexity or a concavity, is then covered with a uniform-thickness metallic layer on one or on both the surfaces, depending on whether one or two grids are desired.

A layer of suitable photographic emulsion is then deposited on the metallic layer, to protect once developed the parts which are not to be etched by the chemical bath. Fabrication of this layer requires particular care, in order to obtain a thickness which is as uniform as possible. This renders the antenna elements more accurate, limiting the collimation errors which can occur during the mask projecting step. The layer can be made by successive spraying with a computer-controlled machine of the type which will be described hereinafter and to whose mobile arm a suitable sprayer is fixed.

The structure prepared in this way is then placed on the surface plate of a computer-controlled machine, supplied with the parameters describing exactly its shape. This machine must be equipped with an arm with at least 5 out of 6 possible degrees of freedom, namely the three translations along the Cartesian axes and the three rotations around the same axes.

A photographic projector is placed at the end of the arm, which will be described hereinafter. This projector can project upon command the mask representing an antenna element or a tiny light spot, which allows the shape of the antenna element to be drawn. In the former case, a suitable program controls the arm so as to translate the projector to the various positions where the centers of the single elements are to be found and hence rotate the projector so that the optical axis may coincide with the perpendicular to the surface of the central point. If the element is a loop, one can immediately start with the projection; if however it is a dipole or a cross, the sixth degree of freedom is to be exploited to orient the mask according to the desired polarization plane, hence the projection can be carried out under program control.

In the latter case, i.e. in the case in which the projector is only capable of projecting a light spot, the program makes the arm draw the entire shape of the antenna element with continuous displacements, controlling in the same time the direction of the projector axis so as to maintain it always normal to the surface, in particular when long strips are to be implemented for a polarization dichroic.

Presently various types of suitable computer-controlled machines are commercially available. A first type consists of the socalled measuring machines. They are equipped with a bridge capable of translating perpendicularly to the bridge movement. The carriage supports an arm which can be displaced in height and which bears the measuring probe with possibility of two rotating movements, for 5 degrees of freedom. The measuring probe can be easily replaced by the already-mentioned projector to implement the invention method. The accuracy degree of this machine is very high, even $+$ or $-1$ $\mu$m.

Another kind of computer-controlled machine is the so-called assembling robot. A typical embodiment of this machine is shown in FIG. 2. It is supplied with a surface plate PR and with an arm BR equipped with a pincers PI, whereto the projector can be applied. The degrees of freedom are still 5, namely, a movement of carriage CA along the guide GU in the direction of the axis x, a movement of column CO inside the guide obtained in carriage CA along axis z and the movement of arm BR in the guide formed by headstock TE along axis y. Then two possible rotations are possible: rotation of wrist PO around the axis of arm BR and that of pincers PI around itself. Accuracy is generally lower than that of measuring machines; typical tolerances are of the order of $+$ or $-25$ $\mu$m.

Also anthropomorphic robots presenting 6 degrees of freedom and tolerances of $+$ or $-100$ $\mu$m can be used.

After all selective antenna elements have been projected onto the surface or on both surfaces of the insulating layer, one at a time, the photographic emulsion is developed and chemical etching of the exceeding parts of the conductive layer is carried out.

A kind of projector suited to the method of the invention is shown in FIG. 3. It comprises a punctiform light source SP, e.g. a semiconductor laser or a laser of another kind, duly cooled by an electric fan VE so as to avoid attitude variations from excessively high thermal expansion. This is particularly necessary when the light source suffers high power dissipation. A diaphragm DI and an optical condensor CD are placed before the source. The light beam outgoing from traverses mask MA, whereupon the shape of the figure to be projected is reproduced and is focussed by a projecting objective OP. OP can be adjusted thus as to allow focusing of the image on the surface of the dichroic structure and possible magnifications or reductions of the same figure. The projection objective should have good depth of field so as to reduce to the minimum deformations due to the projection onto a generally-curved surface. Also mask MA can be exactly centered by adjusting devices DC. Finally, a flange FL allows the projector to be fixed to the mobile arm of the computer-controlled machine.

Figures 4A, 4B:
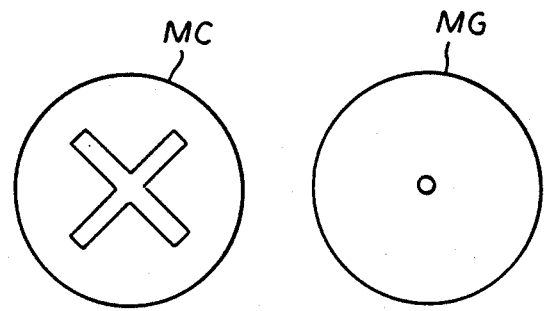
FIGS. 4A and 4B show diagrammatically two masks for the projection of antenna elements.

FIGS. 4A and 4B show two masks MC and MG, which can be used to project respectively a cross-shaped element and a light spot for drawing any selected and preprogrammed element pattern.

Figure 5A:
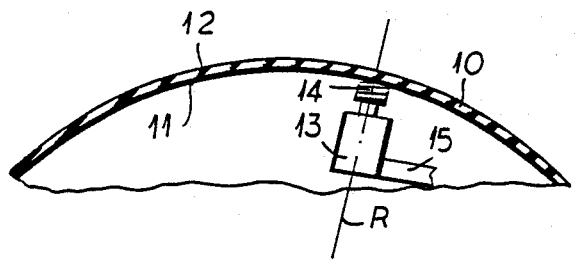
FIGS. 5A through 5C show successive steps in the fabrication of a curved, e.g. parabolical, antenna structure according to the invention.

As can be seen in FIG. 5A, the curved substrate 10 which is to be formed into the antenna according to the invention comprises dichroic material which can have one or two currved surfaces 11 and 12, respectively a concave surface and a convex surface. Each of these surfaces may be formed directly by machining using, for example, a machining head 13 with a cutter 14 which can be gripped at 15 by the pincer PI of the 5 or 6 axis computer-controlled machine shown in FIG. 2 and whose computer has been diagrammatically represented at C and is programmed to form the respective inner or outer curved shape whereby numerical control techniques or CAM (computer assisted machining) techniques.

The substrate 10 is then provided with metallic layers 16 and 17 along the or each curve surface (FIG. 5B), e.g. by spraying from a head 18 connected at 19 to the computer controlled machine of FIG. 2. In all cases, the cutter head 13, the spray head 18 or the like can have the axis always coincident with a radius R of the curved surface so that that axis will always lie perpendicular to the surface and can be held by the computer at a constant distance from the surface which is formed a high machining precision is thus achieved.

Figure 5B:
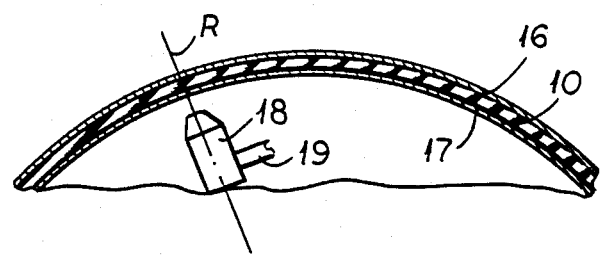
Figure 5C:
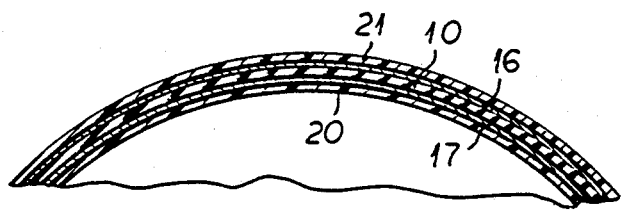
Figure 6:
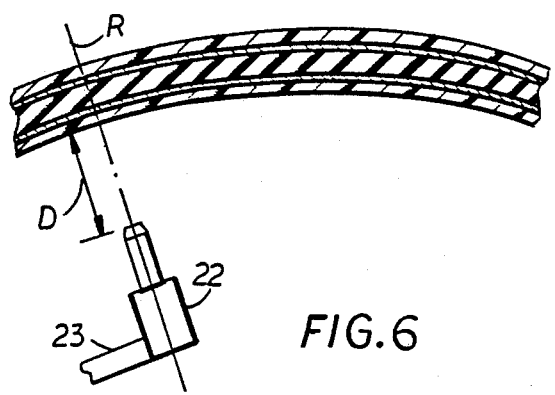
FIG. 6 is a detailed view diagrammatically illustrating one of these steps.

As can be seen from FIG. 5C, photographic emulsion coatings 20 and 21 are provided on the respective metallic coatings 17 and 16, also by spraying, e.g. as shown in FIG. 6 from a spray head 22 affixed to the computer controlled machine at 23 and whose axis also coincides with radius R and which is at a fixed distance D from the surface to be coated.

Figure 8:
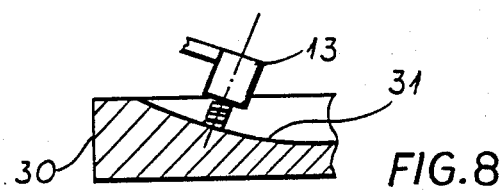
FIG. 8 is showing a step in the fabrication of an antenna structure as an alternative to the approach of FIG. 5A.
Figure 7:
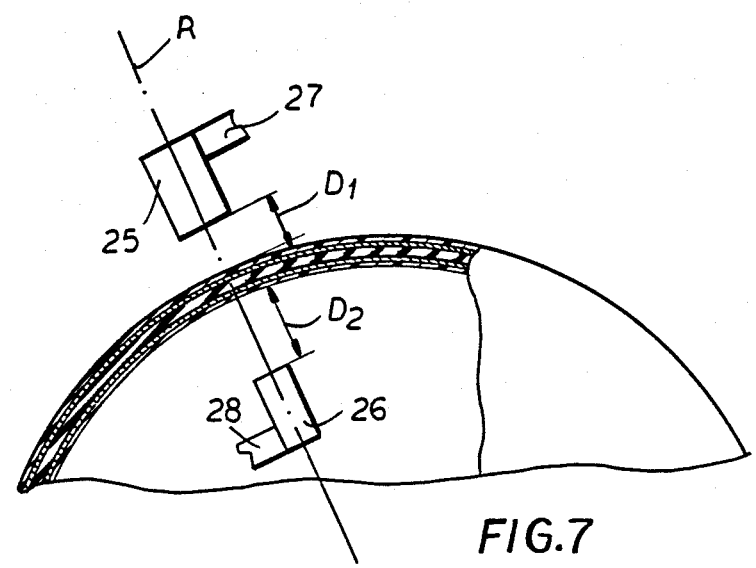
FIG. 7 is a view similar to FIG. 6 illustrating another of these steps.

In FIG. 7 we have shown the exposure of the photographic emulsion layer utilizing two exposure heads 25 and 26 each of which can be connected to the computer controlled machine at 27 and 28 or to respective computer controlled machines so that there optical axes coincide with a radius and are always perpendicular to the surface to be exposed. Each exposure can image an entire element (FIGS. 1A through 1D) utilizing a mask of corresponding shape, or can describe the configuration of an element point by point. In both cases, however, for each element to be sufficiently patterned in the emulsion or imaged thereon, the exposure head is automatically maintained by the computer C at a fixed distance $D_1$ or $D_2$ from the emulsion surface. FIG. 8 represents an alternative to FIG. 5A. Here the curved substrate is prepared by machining a body 30 utilizing the cutter 13 and then shaping the antenna substrate in the mold cavity 31 which is thus formed. Here as well the cutter 13 is connected to the computer-controlled machine.

Figure 9:
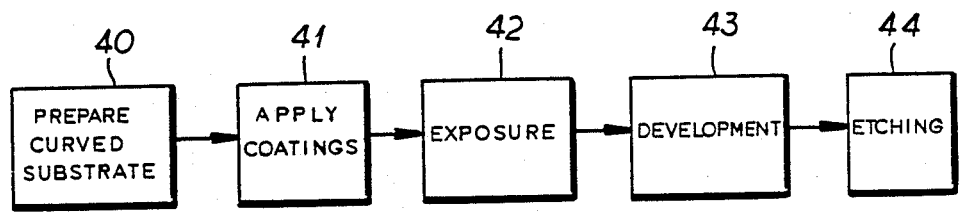
FIG. 9 is a block diagram of the sequence of steps of the invention.

FIG. 9 merely represents the sequence of steps including the preparation of the curved substrate at 40 as per the techniques described in connection with FIGS. 5A and 8, followed by the application of the coatings at 41 as described in conjunction with FIGS. 5B and 6, the exposure 42 as represented in FIG. 7, the development step 43 and the etching step 44, both of which have been previously described in detail.

We claim:

1. A method of making a dichroic antenna structure, comprising the steps of:
   forming an antenna substrate of insulating material with at least one curved surface upon which a multiplicity of conductive antenna elements are to be formed in a predetermined array;
   metallizing said curved surface by applying a metallic layer thereto;
   depositing a uniform layer of a photographic emulsion on the metallic layer on said curved surface;
   exposing said layer of photographic emulsion to image a shape of an antenna element, element-by-element thereon by training exposing radiation on said emulsion from an exposing-radiation source which is maintained at a constant distance from said layer of emulsion for each image and is oriented so that an optical axis of said source is perpendicular to said surface for each image and images of a multiplicity of said elements are formed in closely spaced relationship in said array;
   developing th exposed layer; and
   chemically etching said metallic layer in accordance with the developed pattern of the exposed layer of photographic emulsion so that said conductive antenna elements are formed on said surface in said array, said source being oriented and maintained at said distance by mounting it on a mobile arm of a computer-controlled machine having at least five axis mobility, said uniform layer of said photographic emulsion is deposited on said metallic layer by spraying said photographic emulsion onto said metallic layer from a spray head affixed to said arm.

2. The method defined in claim 1, wherein said antenna substrate is formed by:
   shaping a mold complementary to said surface by cutting a mold body with a cutter head affixed to said machine; and
   molding said substrate in said mold.

3. The method defined in claim 2, wherein said antenna substrate is formed by shaping a body of said insulating material with a cutter head affixed to said machine.

4. The method defined in claim 1 wherein an image of each element is wholly projected as a unit on said layer of photographic emulsion in the exposure thereof and at a predetermined location upon said surface.

5. The method defined in claim 1 wherein an image of each element is projected and built up point-by-point on said layer of photographic emulsion in the exposure thereof and at a predetermined location upon said surface.

6. The method defined in claim 1, wherein said machine is a measuring machine.

7. The method defined in claim 1, wherein said machine is an assembly robot.

8. The method defined in claim 1, wherein said machine is an anthropomorphic robot.

9. The method defined in claim 1 wherein said substrate has two curved surfaces including a concave surface and a convex surface, each of said surfaces receiving an array of said elements by:
   metallizing said curved surfaces by applying said metallic layer thereto;
   depositing respective uniform layers of said photographic emulsion on the metallic layers;
   exposing said layers of photographic emulsion to image element-by-element thereon by training exposing radiation on said emulsion from a source which is maintained at a constant distance from each of said layers of emulsion for each image and is oriented so that an optical axis of said source is perpendicular to said surfaces for each image;
   developing the exposed layers; and
   chemically etching said metallic layers in accordance with the developed pattern of the exposed layers of photographic emulsion so that said conductive antenna elements are formed on both of said surfaces.

* * * * *